United States Patent
Yamada et al.

(10) Patent No.: US 9,813,256 B2
(45) Date of Patent: Nov. 7, 2017

(54) INFORMATION PROCESSING APPARATUS, INFORMATION PROCESSING METHOD, AND PROGRAM

(71) Applicant: SONY CORPORATION, Minato-Ku (JP)

(72) Inventors: Kazuko Yamada, Tokyo (JP); Masato Shimakawa, Kanagawa (JP); Yoshihiro Manabe, Tokyo (JP); Seiji Miyama, Kanagawa (JP); Satoshi Hiroi, Chiba (JP)

(73) Assignee: SONY CORPORATION, Tokyo (JP)

( * ) Notice: Subject to any disclaimer, the term of this patent is extended or adjusted under 35 U.S.C. 154(b) by 187 days.

(21) Appl. No.: 14/291,873

(22) Filed: May 30, 2014

(65) Prior Publication Data

US 2015/0026302 A1 Jan. 22, 2015

(30) Foreign Application Priority Data

Jul. 19, 2013 (JP) .................................. 2013-150301

(51) Int. Cl.
*H04L 12/28* (2006.01)

(52) U.S. Cl.
CPC ...... *H04L 12/2812* (2013.01); *H04L 12/2834* (2013.01); *H04L 2012/2849* (2013.01)

(58) Field of Classification Search
CPC .......................... H04L 12/2812; H04L 12/2834
See application file for complete search history.

(56) References Cited

U.S. PATENT DOCUMENTS

| 8,468,218 B2* | 6/2013 | Shinada | H04N 21/6587 709/219 |
| 2009/0100147 A1* | 4/2009 | Igarashi | H04N 7/17309 709/218 |
| 2012/0011222 A1* | 1/2012 | Yasukawa | H04L 67/16 709/217 |
| 2012/0158917 A1* | 6/2012 | Julia | H04N 1/00127 709/219 |
| 2012/0260169 A1* | 10/2012 | Schwartz | G06F 17/30029 715/716 |

FOREIGN PATENT DOCUMENTS

JP 2009-231974 10/2009

* cited by examiner

*Primary Examiner* — Scott B Christensen
(74) *Attorney, Agent, or Firm* — Oblon, McClelland, Maier & Neustadt, L.L.P.

(57) ABSTRACT

Provided is an information processing apparatus including a communication unit and a controller. The communication unit is capable of connecting to, via a fourth network, a first server and a first device existing in a first network, a second server and a second device existing in a second network, and a relay server that exists in a third network and stores connection information with respect to the first server and the second server. The controller is capable of controlling the communication unit to receive the connection information from the relay server and controlling data transmission processing between the first device and the second device via the first server and the second server using the connection information.

16 Claims, 13 Drawing Sheets

| Device list |
|---|
| Home-b |
|  Sony Corporation<br>My nasne<br>ec:1f:46:fc:a1:27<br>Owner: Hanako Yamada<br>Location: Living room |
| 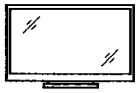 Sony Corporation<br>BRAVIA W600A<br>9c:aa:c1:15:a2:6d<br>Owner: Taro Yamada<br>Location: Bedroom |
| Home-a |
| 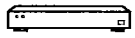 Sony Corporation<br>BDZ-AT2800<br>9c:aa:c1:72:ec:05<br>Owner: Study room<br>Location: Living room |
|  Sony Corporation<br>BRAVIA W600A<br>9c:aa:c1:72:ec:05<br>Owner: Ichiro Suzuki<br>Location: Living room |

FIG.7

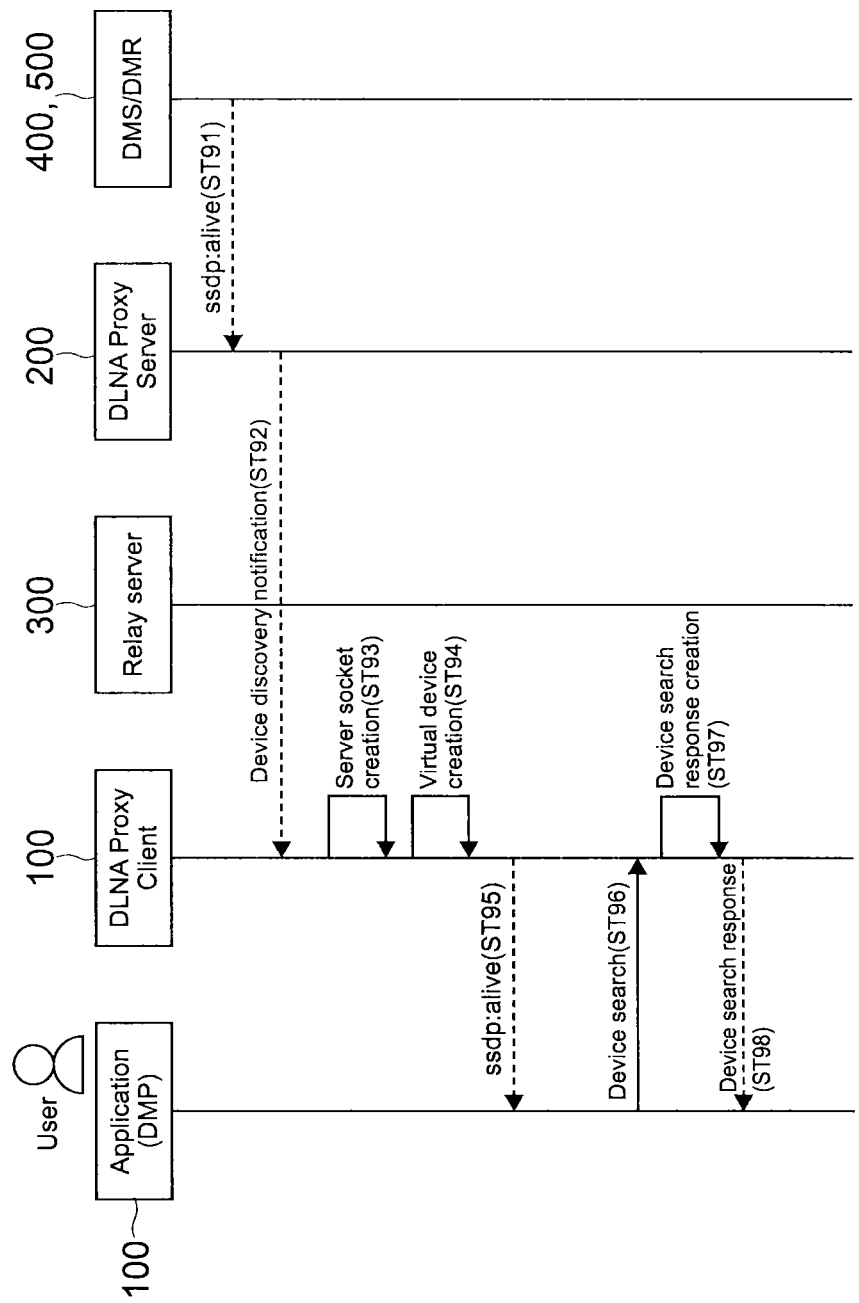

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2013-150301 filed Jul. 19, 2013, the entire contents of which are incorporated herein by reference.

BACKGROUND

The present disclosure relates to an information processing apparatus capable of remotely accessing another information processing apparatus, an information processing method for the information processing apparatus, and a program.

In recent years, opportunities for a remote access, in which a user views a digital broadcast program recorded onto a BDR (Blu-ray (registered trademark) Recorder) at home or the like or an image stored in a PC (Personal Computer) using a mobile apparatus such as a smartphone from outside, are increasing.

In association with this, DLNA (Digital Living Network Alliance) 1.0 assumes a scenario of 2Box Pull for reproducing a content stored in a server (DMS: Digital Media Server) such as a BDR and a PC by a client (DMP: Digital Media Player) such as a smartphone.

On the other hand, according to DLNA 1.5, a 3Box model for reproducing a content stored in a DMS by a player (DMR: Digital Media Renderer) based on a remote instruction from a controller (DMC: Digital Media Controller) can also be used (see, for example, Japanese Patent Application Laid-open No. 2009-231974; hereinafter referred to as Patent Document 1).

SUMMARY

The technique disclosed in Patent Document 1, however, presupposes that the DMC and DMR exist within the same LAN (Local Area Network) and the DMS exists outside that LAN. Therefore, it is difficult to realize processing such as the 3Box model under the environment where, for example, the DMS is at home (LAN), the DMR is at another person's home (LAN), and the DMC is outside the home (3G (3rd Generation)/LTE (Long term Evolution)) so that the three belong to physically-different networks. In recent years where mobile apparatuses capable of connecting to a 3G line or an LTE line, such as a smartphone functioning as the DMC, have prevailed, network restrictions result in a lack of convenience.

In view of the circumstances as described above, there is a need for an information processing apparatus, an information processing method, and a program that are capable of realizing data transmission processing among apparatuses existing in different networks by remote control from outside those networks.

According to an embodiment of the present disclosure, there is provided an information processing apparatus including a communication unit and a controller.

The communication unit is capable of connecting to, via a fourth network, a first server and a first device existing in a first network, a second server and a second device existing in a second network, and a relay server that exists in a third network and stores connection information with respect to the first server and the second server.

The controller is capable of controlling the communication unit to receive the connection information from the relay server and controlling data transmission processing between the first device and the second device via the first server and the second server using the connection information.

With this structure, the information processing apparatus can realize the data transmission processing among the apparatuses existing in different networks by remote control from outside those networks (e.g., mobile network).

A plurality of first devices may exist in the first network, and a plurality of second devices may exist in the second network. In this case, the relay server may store a device list including the connection information with respect to the plurality of first devices and the plurality of second devices. Also in this case, the controller may be capable of controlling the communication unit to receive the device list from the relay server, generate a message to one of the first device and the second device based on the device list, and transmit the message to one of the first server and the second server.

With this structure, the information processing apparatus can transmit the messages to the first device and the second device via the first server and the second server using the device list.

The information processing apparatus may further include a display unit. In this case, the controller may be capable of controlling the display unit to display, as the device list, attribute information of the first device and the second device such that which of the first network and the second network each of the first device and the second device belongs to can be distinguished. Further, the controller may be capable of generating the message to one of the first device and the second device selected by a user from the device list.

With this structure, by distinguishably displaying, for each network, the attribute information of the devices belonging to different networks on the device list in the information processing apparatus, the user can select a device more easily.

The first network may be built inside a first facility, and the second network may be built inside a second facility. In this case, the controller may be capable of controlling the display unit to incorporate, as the attribute information, positional information indicating a position of the first device in the first facility and a position of the second device in the second facility into the device list.

With this structure, by incorporating the positional information of the device in the facility into the device list, the information processing apparatus can prompt the user to identify the device even when the same type of device exists within the same network.

A first router may exist in the first network, and a second router may exist in the second network. In this case, the controller may be capable of controlling the communication unit to transmit, via the second server, an open request that requests the second router to open a port so that the first device can access the second device.

With this structure, the information processing apparatus can realize so-called piercing processing of the router between the first network and the second network by remote control.

The second device may store a content. In this case, the controller may be capable of controlling the communication unit to transmit the open request when starting a transmission of a message between the first device and the second device for streaming the content from the second device to the first device, and transmit, via the second server, a close request that requests the second router to close the port when the streaming ends.

With this structure, by opening the port only for a minimum time from the start to an end of the streaming, the information processing apparatus can secure security as much as possible.

The controller may be capable of controlling the communication unit to transmit the open request when starting an access to one of the first server and the second server using the received connection information, and transmit, via the second server, a close request that requests the second router to close the port when ending the access to one of the first server and the second server.

With this structure, by requesting to open the port at a timing of starting the remote access to the first or second server and requesting to close the port at a timing of ending the remote access, the information processing apparatus can fully exert remote access performance.

The controller may be capable of controlling the communication unit to transmit a search request for one of the first device and the second device to one of the first server and the second server. In this case, the controller may generate a server socket when receiving a discovery notification with respect to the search request and emulate a virtual device on a local host. Also in this case, the controller may be capable of controlling the communication unit to respond to, via one of the first server and the second server, the message that has been transmitted from one of the first device and the second device via one of the first server and the second server and received via the server socket using the virtual device.

With this structure, by emulating the virtual device, the information processing apparatus can exchange messages with the first or second device existing in a different network using a common protocol such as UPnP (Universal Plug and Play).

According to another embodiment of the present disclosure, there is provided an information processing method including: receiving connection information with respect to a first server existing in a first network and a second server existing in a second network from a relay server that stores the connection information and exists in a third network; and controlling, using the received connection information, data transmission processing between a first device existing in the first network and a second device existing in the second network via the first server and the second server.

According to another embodiment of the present disclosure, there is provided a program that causes an information processing apparatus to execute the steps of: receiving connection information with respect to a first server existing in a first network and a second server existing in a second network from a relay server that stores the connection information and exists in a third network; and controlling, using the received connection information, data transmission processing between a first device existing in the first network and a second device existing in the second network via the first server and the second server.

As described above, according to the embodiments of the present disclosure, data processing among apparatuses existing in different networks can be realized by remote control from outside those networks.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 7 is a diagram showing an example of a remote access connection list (device list) displayed on a display unit of the proxy client (smartphone) according to the first embodiment of the present disclosure;

FIG. 8 is a sequence diagram showing a flow of virtual device emulation processing by the proxy client according to the first embodiment of the present disclosure;

DETAILED DESCRIPTION OF EMBODIMENTS

Hereinafter, embodiments of the present disclosure will be described with reference to the drawings.

First Embodiment

First, a first embodiment of the present disclosure will be described.

[General Outline of System]

Figure 1:
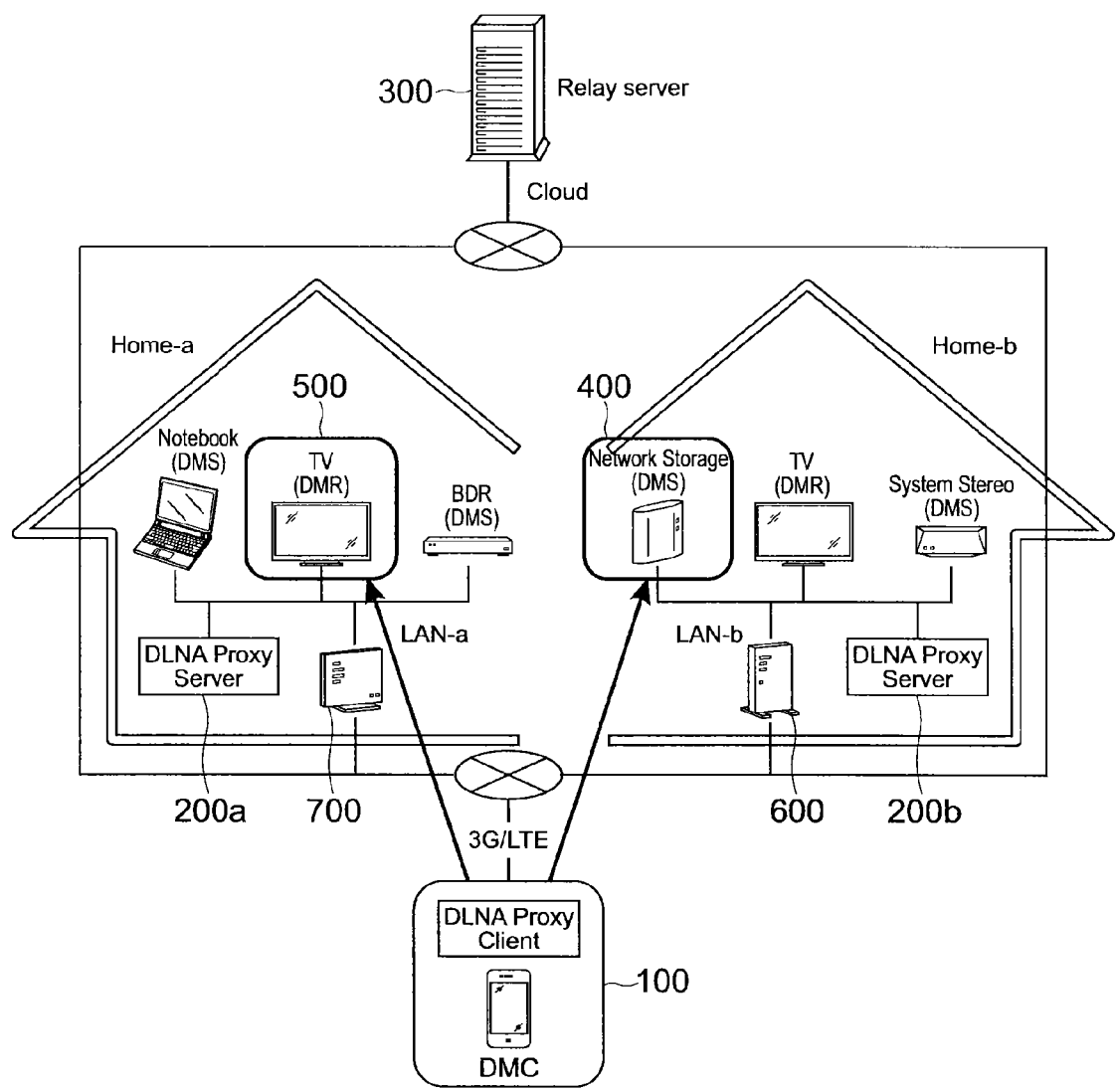
FIG. 1 is a diagram showing a general outline of a remote access system according to a first embodiment of the present disclosure.

FIG. 1 is a diagram showing a general outline of a remote access system of this embodiment.

As shown in the figure, in the system, a LAN-a is built inside a Home-a, and a LAN-b is built inside a Home-b physically apart from the Home-a. The LAN-a and the LAN-b are connectable to a relay server 300 on a cloud (Internet). The LAN-a and the LAN-b are each a home network conforming to DLNA (DLNA 1.5).

A smartphone 100 is present outside the Home-a and the Home-b and is connectable to the LAN-a and the LAN-b via, for example, a 3G network or an LTE network. The smartphone 100 functions as a DMC in DLNA.

Connected to the LAN-a of the Home-a is a DLNA device such as a BDR and a laptop PC functioning as a DMS in DLNA in addition to a TV 500 functioning as a DMR under control of a router 700.

Connected to the LAN-b of the Home-b is a DLNA device such as a system stereo functioning as a DMS and a TV functioning as a DMR in addition to a network storage 400 also functioning as the DMS under control of a router 600.

Further, since message transmission processing by UPnP adopted in DLNA is realized among different networks in this embodiment, a concept of a DLNA proxy is adopted. Specifically, a DLNA proxy server 200 (hereinafter, may simply be referred to as proxy server) is set at a home gateway of each of the LAN-a and the LAN-b. In addition, the smartphone 100 functions as a DLNA proxy client (hereinafter, may simply be referred to as proxy client).

The figure shows two proxy servers 200 and one proxy client 100, but the numbers may each be 3 or more. The proxy servers 200 and the proxy client 100 are notified in advance of the connection information with respect to the relay server 300.

In descriptions below, the devices above may be referred to as DMS, DMR, and DMC according to DLNA.

[Hardware Structure of Smartphone]

Figure 2:
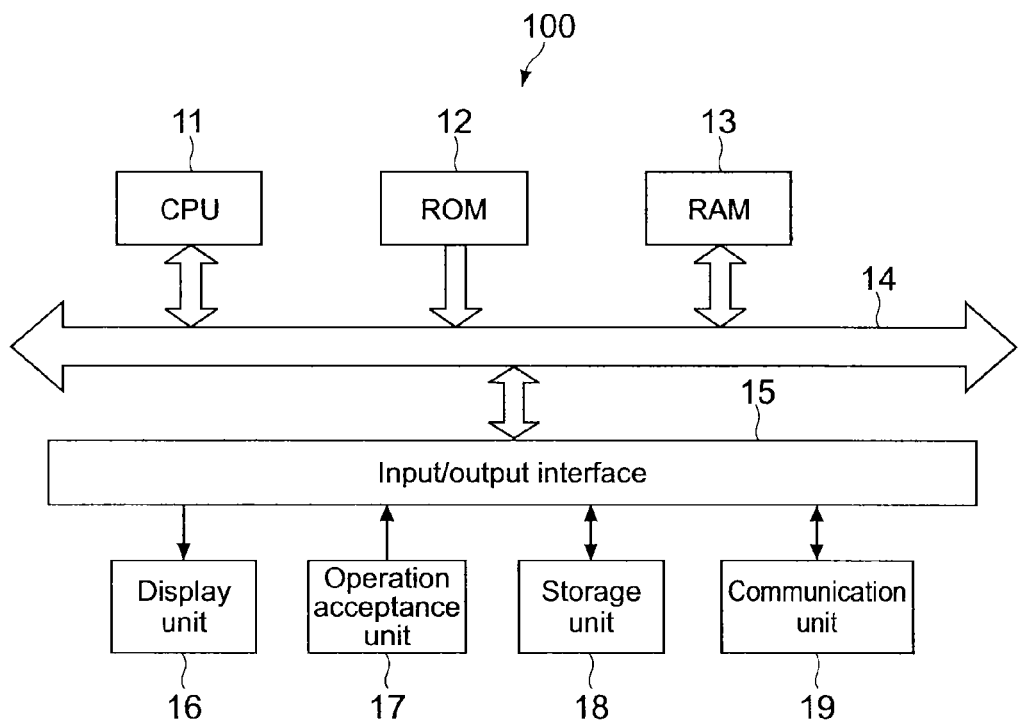
FIG. 2 is a diagram showing a hardware structure of a smartphone constituting the system according to the first embodiment of the present disclosure.

FIG. 2 is a diagram showing a hardware structure of the smartphone 100. As shown in the figure, the smartphone 100 includes a CPU (Central Processing Unit) 11, a ROM (Read Only Memory) 12, a RAM (Random Access Memory) 13, an input/output interface 15, and a bus 14 for connecting those components.

The CPU 11 appropriately accesses the RAM 13 and the like as necessary and collectively controls all the blocks of the relay server 300 while carrying out various types of operational processing. The ROM 12 is a nonvolatile memory that fixedly stores an OS to be executed by the CPU 11 and firmware such as a program and various parameters. The RAM 13 is used as a working area of the CPU 11 and the like and temporarily stores an OS, various applications being executed, and various types of data being processed.

Connected to the input/output interface 15 are a display unit 16, an operation acceptance unit 17, a storage unit 18, a communication unit 19, and the like.

The display unit 16 is a display device that uses, for example, LCD (Liquid Crystal Display), OELD (Organic Electro Luminescence Display), and CRT (Cathode Ray Tube).

The operation acceptance unit 17 is an input apparatus such as a touch panel and a button and is integrated with the display unit 16.

The storage unit 18 is a nonvolatile memory such as a flash memory (SSD: Solid State Drive) and other solid state memories. The storage unit 18 stores an OS, various types of software requisite for message transmission processing based on UPnP, that is performed by a remote access according to this embodiment, and various types of data such as location information of a relay server.

The communication unit 19 is a module for connecting to a mobile network and assumes communication processing with the proxy servers 200 and the relay server 300.

[Hardware Structure of Proxy Server]

Figure 3:
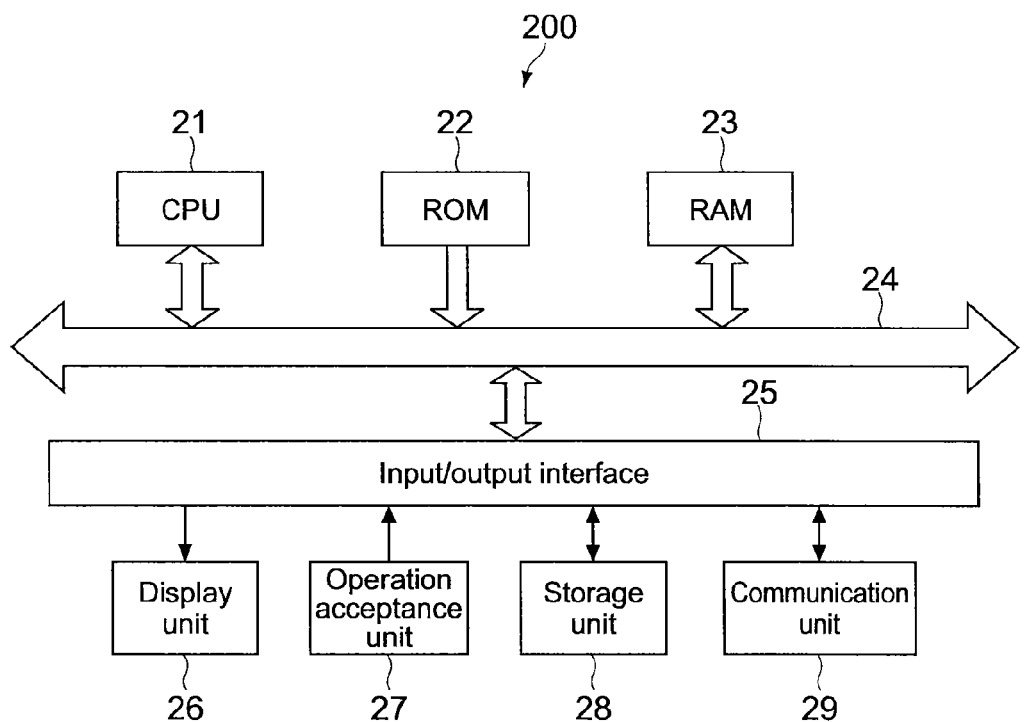
FIG. 3 is a diagram showing a hardware structure of a proxy server constituting the system according to the first embodiment of the present disclosure.

FIG. 3 is a diagram showing a hardware structure of the proxy server 200. As shown in the figure, the hardware structure of the proxy server 200 is basically the same as that of the smartphone 100. In other words, the proxy server 200 includes a CPU 21, a ROM 22, a RAM 23, an input/output interface 25, a bus 24 that connects those components, a display unit 26, an operation acceptance unit 27, a storage unit 28, and a communication unit 29. Here, the display unit may be externally connected to the proxy server 200. In addition, an HDD (Hard Disk Drive) may be used as the storage unit 28.

The CPU 21 controls the blocks such as the storage unit 28 and the communication unit 29 and executes communication processing with the smartphone 100 and the relay server 300 and various data processing.

The storage unit 28 stores various types of software for accepting a remote access from the smartphone 100 and executing message transmission processing based on UPnP, and data such as location information of a relay server.

The communication unit 29 is, for example, an NIC (Network Interface Card) for the Ethernet (registered trademark) and assumes communication processing with the smartphone 100 and the relay server 300.

[Software Structure of System]

Figure 4:
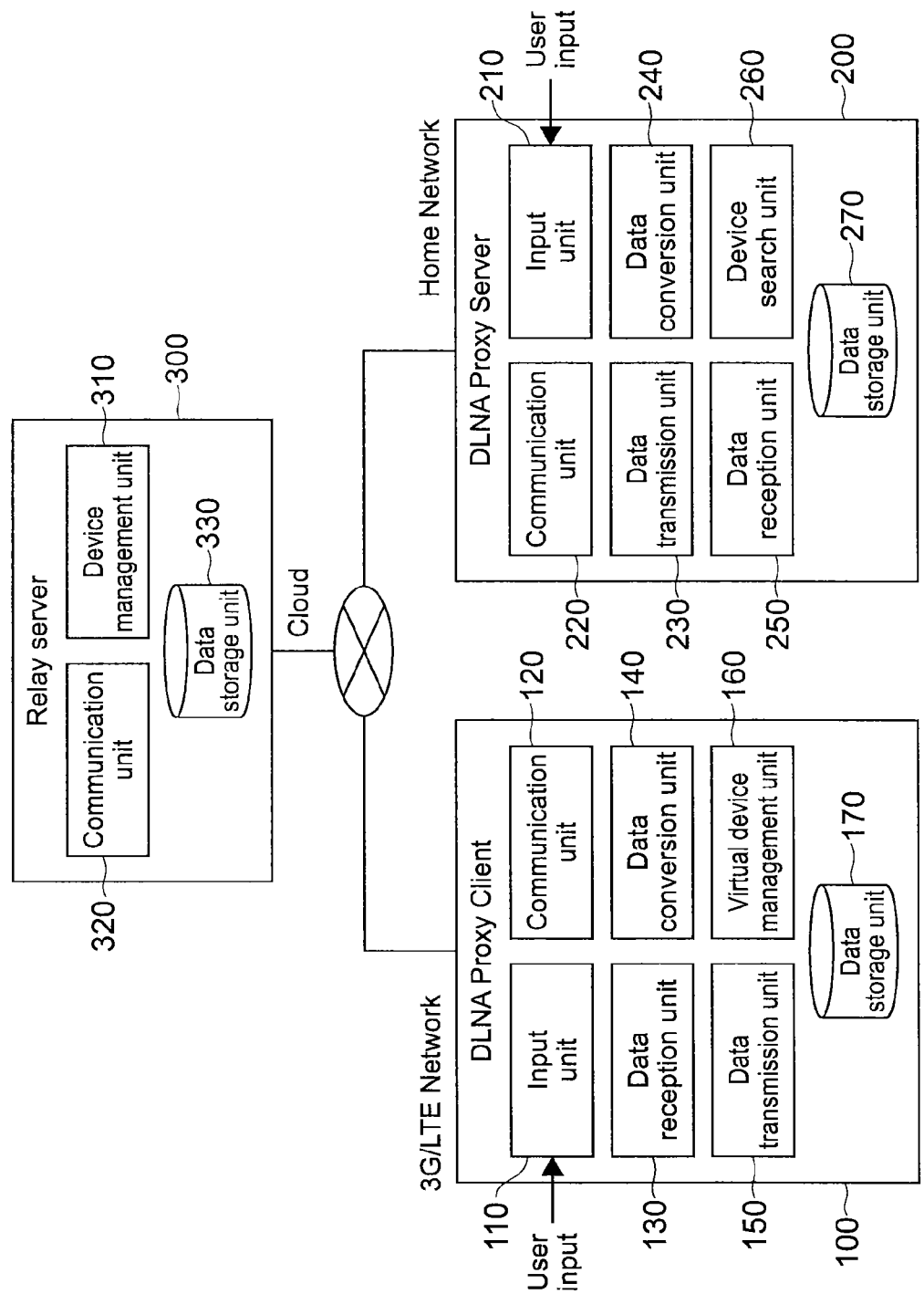
FIG. 4 is a diagram showing software structures of a DLNA proxy client, DLNA proxy server, and relay server constituting the system according to the first embodiment of the present disclosure.

FIG. 4 is a diagram showing software (module) structures of the proxy client 100, the proxy server 200, and the relay server 300 constituting the system.

As shown in the figure, the proxy client (smartphone) 100 includes, as software modules, an input unit 110, a communication unit 120, a data reception unit 130, a data conversion unit 140, a data transmission unit 150, a virtual device management unit 160, and a data storage unit 170.

The input unit 110 detects an input operation from a user.

The communication unit 120 assumes communication processing with the proxy server 200 and the relay server 300.

The virtual device management unit 160 generates a server socket and starts to stand by based on a discovery notification of a DLNA device in a LAN from the proxy server 200 to be described later. Further, the virtual device management unit 160 emulates a virtual device on a local device and starts transmitting a Notify message or an M-SEARCH response message based on UPnP.

The data reception unit 130 receives data from the DMP that has received the message and accessed the virtual device via the proxy server 200. The data reception unit 130 also receives data from the relay server 300.

The data conversion unit 140 overwrites an IP address and port number of the data received by the data reception unit 130 from those of the virtual device to those of the proxy client 100 itself.

The data transmission unit 150 transmits the data converted by the data conversion unit 140 to the proxy server 200.

The data storage unit 170 stores the data and the like received from the relay server 300 and the proxy server 200.

The proxy server 200 includes, as software modules, an input unit 210, a communication unit 220, a data transmission unit 230, a data conversion unit 240, a data reception unit 250, a device search unit 260, and a data storage unit 270.

The input unit 210 detects an input operation from the user.

The communication unit 220 assumes communication processing with the proxy client 100 and the relay server 300.

The data transmission unit 230 transmits messages and data to the proxy client 100, other proxy servers 200, and devices in the LAN. The data transmission unit 230 transmits device search result data and the like to the proxy client 100. The data transmission unit 230 also transmits the converted data received from the proxy client 100 to the DLNA device in the LAN as its original destination (not proxy client 100).

The data conversion unit 240 executes conversion processing of an IP address and port number requisite for exchanging messages based on UPnP with a proxy server in a different LAN.

The data reception unit 250 receives the messages and data from the proxy client 100, other proxy servers 200, and the devices in the LAN.

Upon receiving a request from the proxy client 100, the device search unit 260 searches for, as a proxy of the proxy client 100, the DLNA device in the LAN to which the proxy server 200 itself belongs by an M-SEARCH message and upon discovering the device, notifies the proxy client 100 of the fact.

The data storage unit 270 stores the data and the like received from the relay server 300, the proxy client 100, other proxy servers 200, and the devices in the LAN.

The relay server 300 includes a device management unit 310, a communication unit 320, and a data storage unit 330 as software modules.

The device management unit 310 receives, from the proxy servers 200, information such as location information of each LAN and owner and location information of the devices in the LAN, and manages the information on a list using the data storage unit 330.

The communication unit 320 assumes communication processing of messages and data with the proxy client 100 and the proxy servers 200.

The data storage unit 330 stores the location information of each LAN and information on the devices in the LAN.

[System Operation]

Next, an operation of the system structured as described above will be described. In this and other embodiments, operations of the proxy client 100, the proxy servers 200, the relay server 300, and the devices constituting the system are carried out in cooperation with software executed by and under control of the CPU.

(Device Information Setting and Connection to Relay Server)

Figure 5:
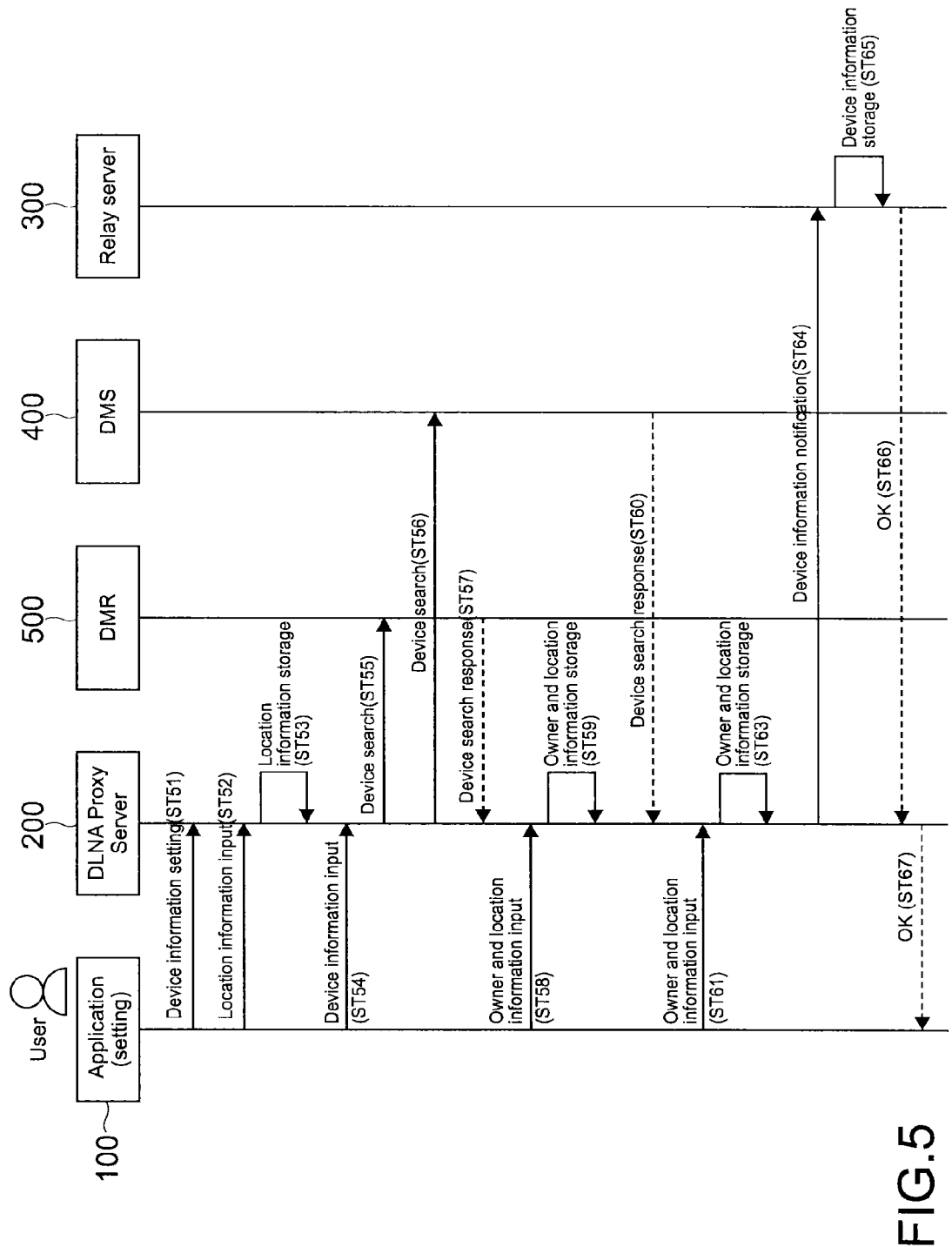
FIG. 5 is a sequence diagram showing a flow of processing of setting information on a device in a LAN and processing of storing the information in the relay server, that are carried out by the proxy server according to the first embodiment of the present disclosure.

First, device information and connection processing with respect to the relay server will be described. FIG. 5 is a sequence diagram showing a flow of processing of setting information on a device in the LAN and processing of storing the information in the relay server 300, that are carried out by the proxy server 200.

In the figure, although the proxy server 200 and an application are illustrated separately for convenience in describing the operations as the software, the proxy server 200 and the application both exist within the same hardware.

As shown in the figure, the user of the proxy server 200 first activates an initial setting screen of the application on the proxy server 200 (Step 51) and inputs location information of the LAN (e.g., home, grandparent's home, and friend's home) (Step 52).

The proxy server 200 stores the location information of the LAN in the data storage unit 270 based on the input (Step 53).

Subsequently, the user inputs device information using the application (Step 54). In response to this, the proxy server 200 executes a device search in its own LAN (Steps 55 and 56), and the user inputs, upon receiving a response from each device (Steps 57 and 60), the owner information (user name) and location information (e.g., living room on first floor at home) of each device (Steps 58 and 61). The proxy server 200 stores the input information in the data storage unit 270 (Steps 59 and 63).

Upon ending the input processing, the proxy server 200 connects to the relay server 300 and notifies the relay server 300 of its own ID and the owner and location information of each device (Step 64). The relay server 300 stores the device information in the data storage unit 330 (Step 65) and notifies the proxy server 200 of the fact (Step 66), and the proxy server 200 notifies the user of that fact (Step 67).

(Device List Acquisition by Remote Access)

Figure 6:
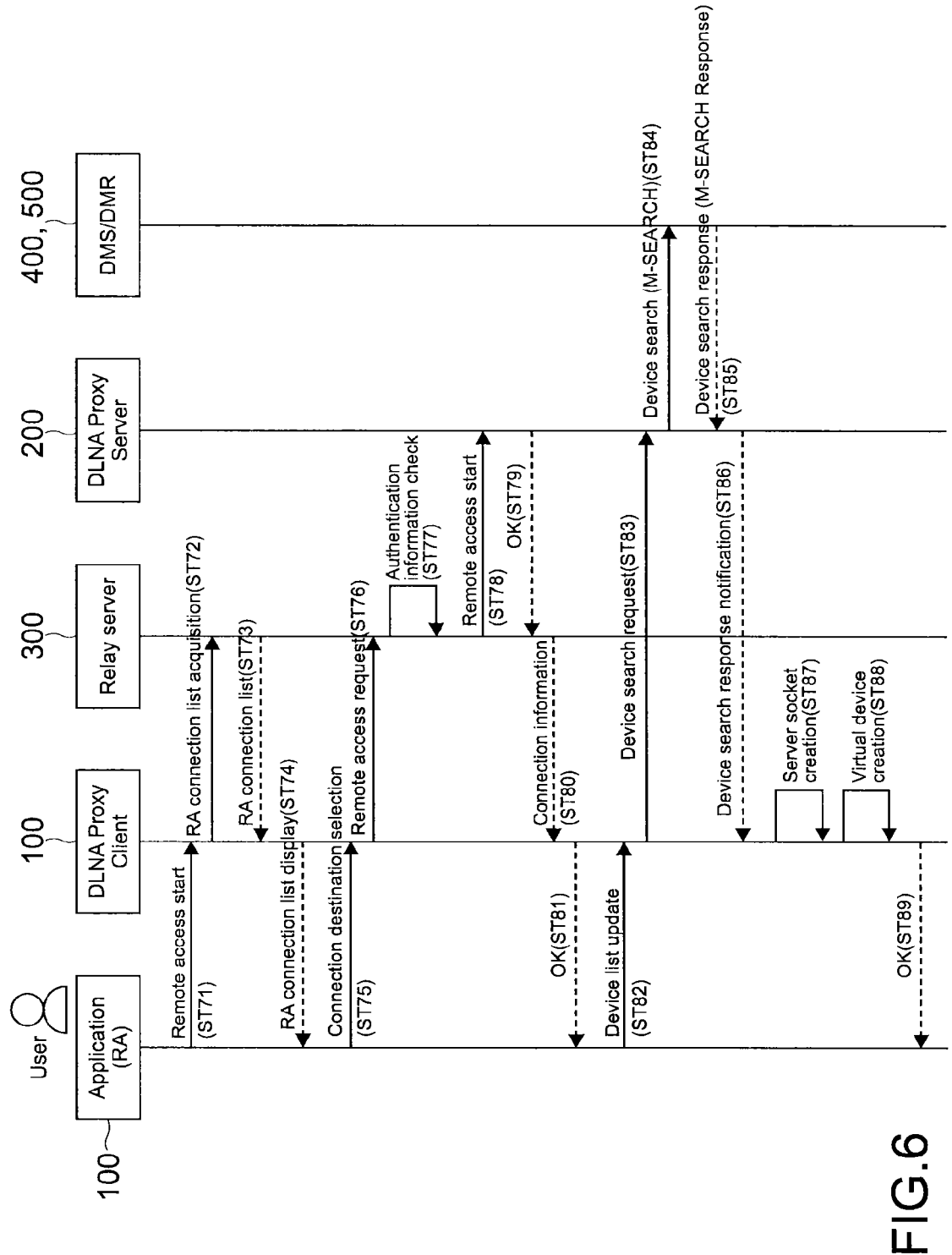
FIG. 6 is a sequence diagram showing a flow of device list acquisition processing carried out by the proxy client through a remote access according to the first embodiment of the present disclosure.

Next, device list acquisition processing by a remote access of the proxy client 100 will be described. FIG. 6 is a sequence diagram showing a flow of the device list acquisition processing.

Although the proxy client 100 and the application are illustrated separately for convenience in describing the operations as the software also in this figure, the proxy client 100 and the application both exist within the same hardware.

Further, it is assumed that the proxy client 100 acquires in advance the ID of the proxy server 200 as a connection target and authentication information thereof (passphrase etc.).

As shown in the figure, the user of the proxy client 100 first instructs the proxy client 100 to start a remote access using the application from outside (Step 71).

Subsequently, the proxy client 100 requests the relay server 300 to acquire a remote access (RA) connection list (Step 72) and upon acquiring the remote access connection list from the relay server 300 (Step 73), presents the list to the user (Step 74).

FIG. 7 is a diagram showing an example of the remote access connection list (device list) to be displayed on the display unit 16 of the proxy client (smartphone) 100.

As shown in the figure, in the device list, the location information of each LAN (Home-b, Home-a (home, grandparent's home, etc. in actuality)) stored in the relay server 300 and a list of DLNA devices belonging to that LAN (including location and owner information) are categorized and displayed. Specifically, in the device list, which DLNA device belongs to what LAN can be distinguished, and information indicating a position of the device in a facility where the LAN is built (living room, bedroom, etc.) and owner information are also displayed.

In the example shown in the figure, the location information and device information of all the LANs, that are stored in the relay server 300, are displayed. However, it is also possible to limit the LAN and device information to be displayed on the remote access connection list so that, based on a group ID allocated to each LAN and the like, only the information of the LAN belonging to the relevant group is displayed, for example.

As the user inputs a connection destination device and a passphrase thereof from the list (Step 75), the proxy client 100 requests the relay server 300 for a remote access to the device (Step 76).

The relay server 300 checks the authentication information (ID) of the proxy client 100 (Step 77) and when confirmed, requests the proxy server 200 for a start of the remote access (Step 78) to acquire connection information with respect to the proxy server 200 (Step 79). Then, the relay server 300 notifies the proxy client 100 of the connection information (Step 80), and the proxy client 100 notifies the user of that information (Step 81).

After this processing, the proxy client 100 and the proxy server 200 directly exchanges messages and data without the intervention of the relay server 300. In other words, the proxy client 100 uses the connection information to control the data transmission processing with respect to a DLNA device in a different LAN via the proxy server 200.

As the user of the proxy client 100 selects a connection destination device via a remote access application, the proxy client 100 connects to the proxy server 200 and starts the remote access.

Further, as the user updates the remote device list on the remote access application (Step 82), the proxy client 100 requests the proxy server 200 for a device search (Step 83).

As a proxy of the proxy client 100, the proxy server 200 exchanges an M-SEARCH message with the DLNA device in the LAN to which the server itself belongs (Steps 84 and 85) and notifies the proxy client 100 of the response result (Step 86).

Upon receiving the notification, the virtual device management unit 160 of the proxy client 100 generates a server socket on the local device and starts Listen (Step 87). Then, the virtual device management unit 160 emulates a virtual device and starts transmitting a Notify message or M-SEARCH response message (Steps 88 and 89).

(Virtual Device Emulation Processing)

Here, the virtual device emulation processing will be described in more detail. FIG. 8 is a sequence diagram showing a flow of the virtual device emulation processing.

As shown in the figure, as the DLNA device (DMS/DMR) in the LAN to which the proxy server 200 belongs comes online (power ON), the Notify message (ssdp:alive) is transmitted in multicast (Step 91).

The proxy server 200 that has received the message and discovered the DLNA device notifies the proxy client 100 of that fact (Step 92).

Based on the notification, the virtual device management unit 160 of the proxy client 100 similarly creates a server socket (Step 93), starts Listen, and emulates a virtual device on the local device (Step 94). ssdp:alive from the DLNA device is also notified to the user (Step 95).

Furthermore, as the DMP application on the network to which the proxy client 100 belongs transmits a device search (M-search) message (Step 96), the virtual device receives the device search (M-search) message and creates and returns a response message (M-SEARCH Response) (Steps 97 and 98).

The proxy client 100 only directly receives the notification from the proxy server 200 and does not transmit the messages to the proxy server 200. Accordingly, a data transfer load in P2P communication is alleviated.

The device on the LAN (DMS/DMR) to which the proxy server 200 belongs transmits a Notify message (ssdp:byebye) after coming offline (power OFF). Also in this case, the proxy server 200 notifies the proxy client 100 of that fact, and upon being notified, the virtual device transmits the ssdp:byebye message.

Then, the virtual device management unit 160 deletes the relevant virtual device and closes the server socket.

When the device on the LAN (DMS/DMR) to which the proxy server 200 belongs suddenly disappears without any notification (e.g., network cable becomes unplugged), the proxy server 200 notifies the proxy client 100 of that fact assuming that the device has disappeared after an elapse of max-age since having received the final ssdp:alive message. Upon being notified, the proxy client 100 carries out the same processing as in the case of receiving the ssdp:byebye message. As a result, the virtual device is prevented from existing wastefully for an indefinite period of time.

(Device Description and Content List Acquisition Processing)

Figure 9:
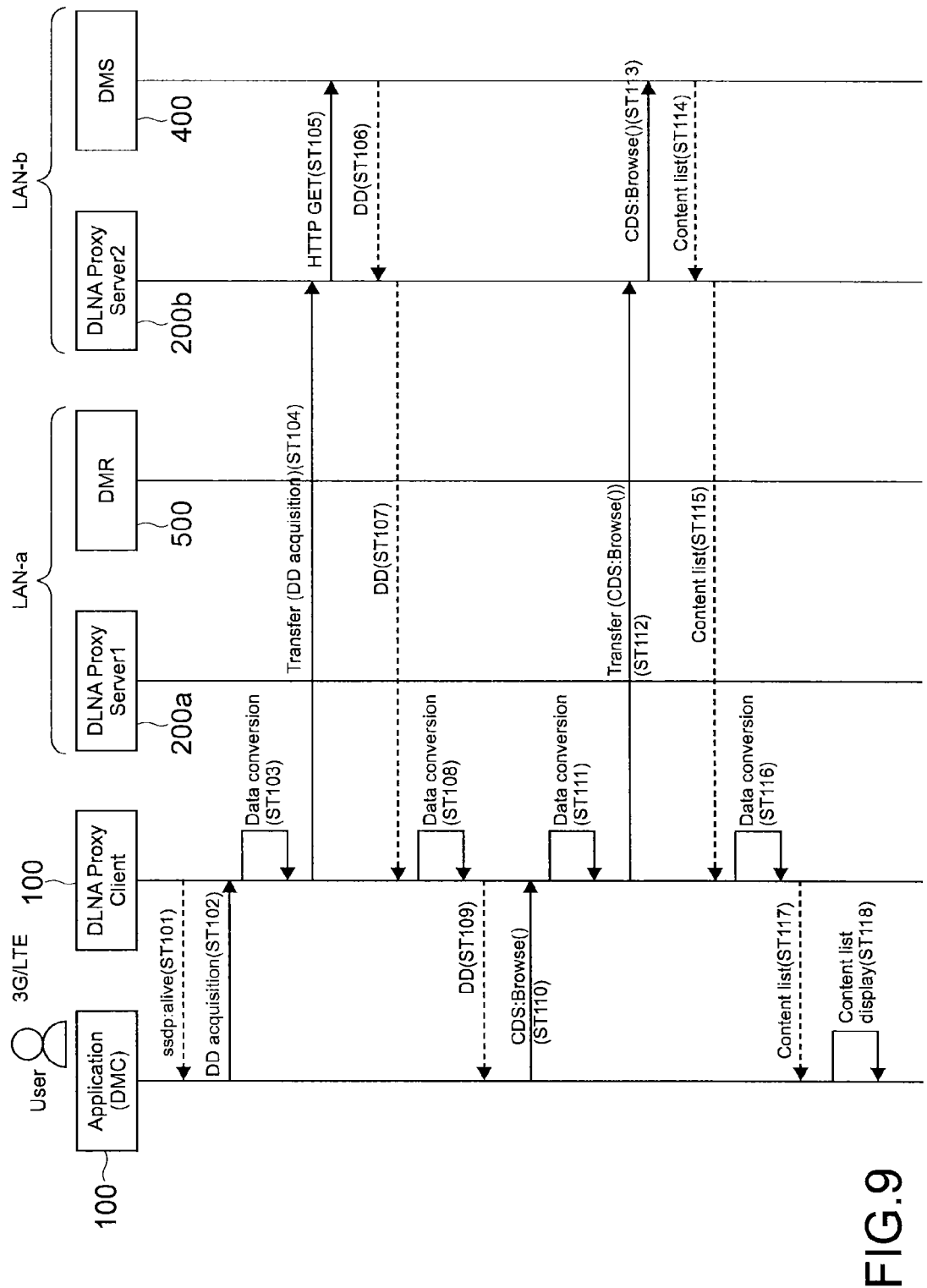
FIG. 9 is a sequence diagram showing a flow of Device Description and content list acquisition processing according to the first embodiment of the present disclosure.

Next, a flow of processing for the application of the DMC that has received ssdp:alive to access the proxy client for acquiring a Device Description and content list will be described. FIG. 9 is a sequence diagram showing the flow of the processing.

As shown in the figure, upon receiving ssdp:alive from the proxy client 100 (Step 101), the application of the DMC requests the proxy client 100 to acquire Device Description (hereinafter, referred to as DD) (Step 102).

The proxy client 100 accepts the request, overwrites the IP address and port number by those of the DLNA device (DMS 400) as the destination (Step 103), and transfers the data to the proxy server 200*b* of the LAN-b to which the DMS 400 belongs (Step 104).

The proxy server 200*b* transmits the data to the DMS 400 as the actual destination by HTTP GET (Step 105), receives the DD as a response (Step 106), and transmits it to the proxy client 100 (Step 107).

The proxy client 100 overwrites the address of the received DD by its own address (Step 108) and transmits it back to the DMC (Step 108).

The same processing as the DD acquisition processing is executed also for the content list acquisition processing (CDS; Browse( )) for a content (moving image content, audio content, etc.) stored in the DMS 400. Specifically, after converting data of the request from the DMC (Step 110) (Step 111), the proxy client 100 transfers it to the proxy server 200*b* (Step 112) where it is transmitted to the DMS 400 to acquire a content list (Step 114), and the content list is transmitted back to the proxy client 100 (Step 115). The content list is subjected to a data conversion (Step 116), transmitted back to the DMC (Step 117), and displayed (Step 118).

(Remote Reproduction Processing)

Figure 10:
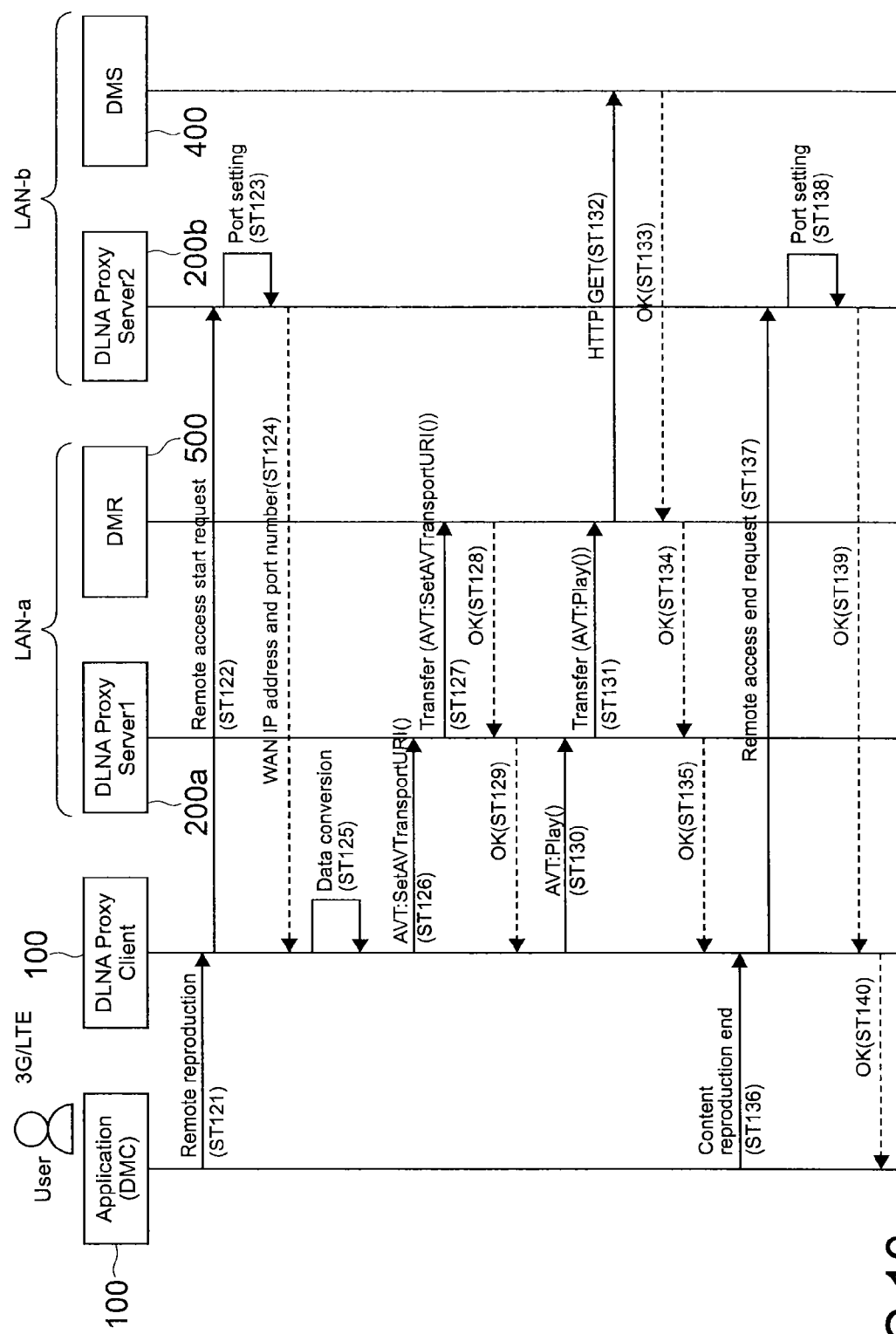
FIG. 10 is a sequence diagram showing a flow of remote reproduction processing by the proxy client according to the first embodiment of the present disclosure.

Next, remote reproduction processing that is based on the acquired content list will be described. FIG. 10 is a sequence diagram showing a flow of the remote reproduction processing.

As shown in the figure, as the user of the DMC instructs a remote reproduction of a content via the application (Step 121), the proxy client 100 requests a start of a remote access with respect to the proxy server 200*b* in the LAN to which the DMS 400 belongs (Step 122).

The proxy server 200*b* that has received the request opens a port of the router 600 (port mapping, so-called router piercing) using UPnP IGD, sets a streaming port (Step 123), and notifies the proxy client 100 of the IP address and port number on the WAN corresponding to the DMS 400 (Step 124).

The proxy client 100 overwrites the URL address of the reproduction target content by the IP address and port number (Step 125) and transmits an AVT:SetAVTransportURl( ) message to the DMR 500 via the proxy server 200*a* to which the DMR 500 belongs to set the reproduction target content (Steps 126 to 129).

Subsequently, the proxy client 100 transmits AVT:Play( ) to the DMR 500 via the proxy server 200*a* so that the DMR 500 starts reproducing the content (Steps 130 to 135).

When the DMC application transmits an AVT:GetAVTransportInfo( ) message or AVT:GetPositionInfo( ) message for checking a reproduction state of the content, the proxy client 100 overwrites the URL as in the case of CDS:Browse( ) and transfers it to the proxy server 200*a*.

As the DMC application notifies the proxy client 100 of the reproduction end of the content (Step 136), the proxy client 100 requests an end of the remote access with respect to the proxy server 200b (Step 137).

Upon receiving the request, the proxy server 200b closes the port using UPnP IGD (Step 138) and notifies the proxy client 100 of the fact (Steps 139 and 140). The closed state of the port may be judged based on an event of GENA (General Event Notification Architecture), for example.

SUMMARY

As described above, according to this embodiment, a remote reproduction system based on a 3Box model of DLNA is realized without causing the user to waste time or having to reconfigure the existing DMP.

Moreover, since not only the location information of the network to which the DLNA device belongs is displayed, but also the devices are displayed in categorization for each network, the user can easily grasp what kind of device is in what home.

Furthermore, since the location information and owner information of the device are displayed on the device list, the user can easily distinguish one from the other even when there are a plurality of devices of the same model within the same LAN.

Second Embodiment

Next, a second embodiment of the present disclosure will be described. In descriptions below, descriptions on structures that are the same as those of the first embodiment will be omitted.

In the first embodiment above, the proxy client 100 transmits a remote access start request to the proxy server 200b on the DMS 400 side as shown in FIG. 10. However, in this embodiment, the proxy server 200a on the DMR 500 side may directly request the proxy server 200b of a remote access to request a setting of a streaming port.

Figure 11:
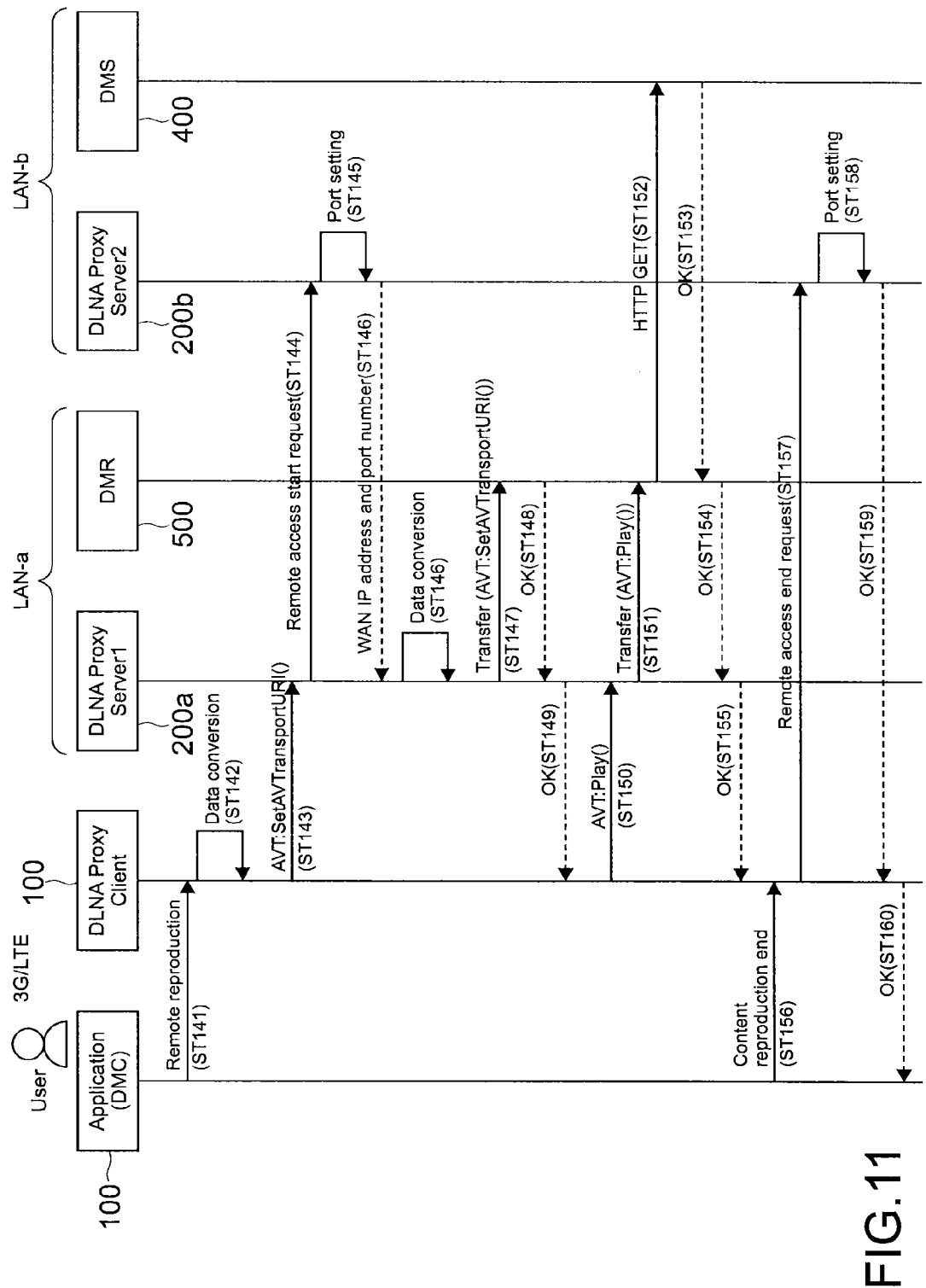
FIG. 11 is a sequence diagram showing a flow of remote reproduction processing by a proxy client according to a second embodiment of the present disclosure.

FIG. 11 is a sequence diagram showing a flow of the remote reproduction processing in this case.

As shown in the figure, when the user instructs a remote reproduction using the DMC application (Step 141), the proxy client 100 carries out requisite address conversion processing (Step 142). Then, the proxy client 100 causes the proxy server 200b to issue a token requisite for setting a streaming port, incorporates the token and the ID of the proxy server 200b into a part of the URL of AVT:SetAVTransportURI( ), and transmits it to the proxy server 200a (Step 143).

The proxy server 200a requests a start of the remote access with respect to the proxy server 200b based on those information (Step 144). The token may be issued when the remote access is started or may be issued every time the remote reproduction is performed.

As the port is opened (Step 145), the IP address and port number on the WAN corresponding to the DMS 400 are notified to the proxy server 200a (Step 146).

The proxy server 200a carries out requisite address conversion processing (Step 146) and transfers AVT:SetAVTransportURI( ) to the DMR 500 in the LAN to which the proxy server 200a itself belongs (Step 147).

Upon completing the setting of a reproduction target content (Steps 148 and 149), the proxy client 100 transmits AVT:Play( ) to the DMR 500 via the proxy server 200a and causes the DMR 500 to start reproducing the content (Steps 150 to 155). The processing after that is the same as that shown in FIG. 10.

Third Embodiment

Next, a third embodiment of the present disclosure will be described. In descriptions below, descriptions on structures that are the same as those of the first and second embodiments will be omitted.

In the first and second embodiments above, the router piercing is executed at a timing of performing the remote reproduction using UPnP IGD. By opening the port only when necessary as described above, security is secured as much as possible. However, when placing more importance on performance than security, the streaming port may be set at a timing of starting the remote access.

Figure 12:
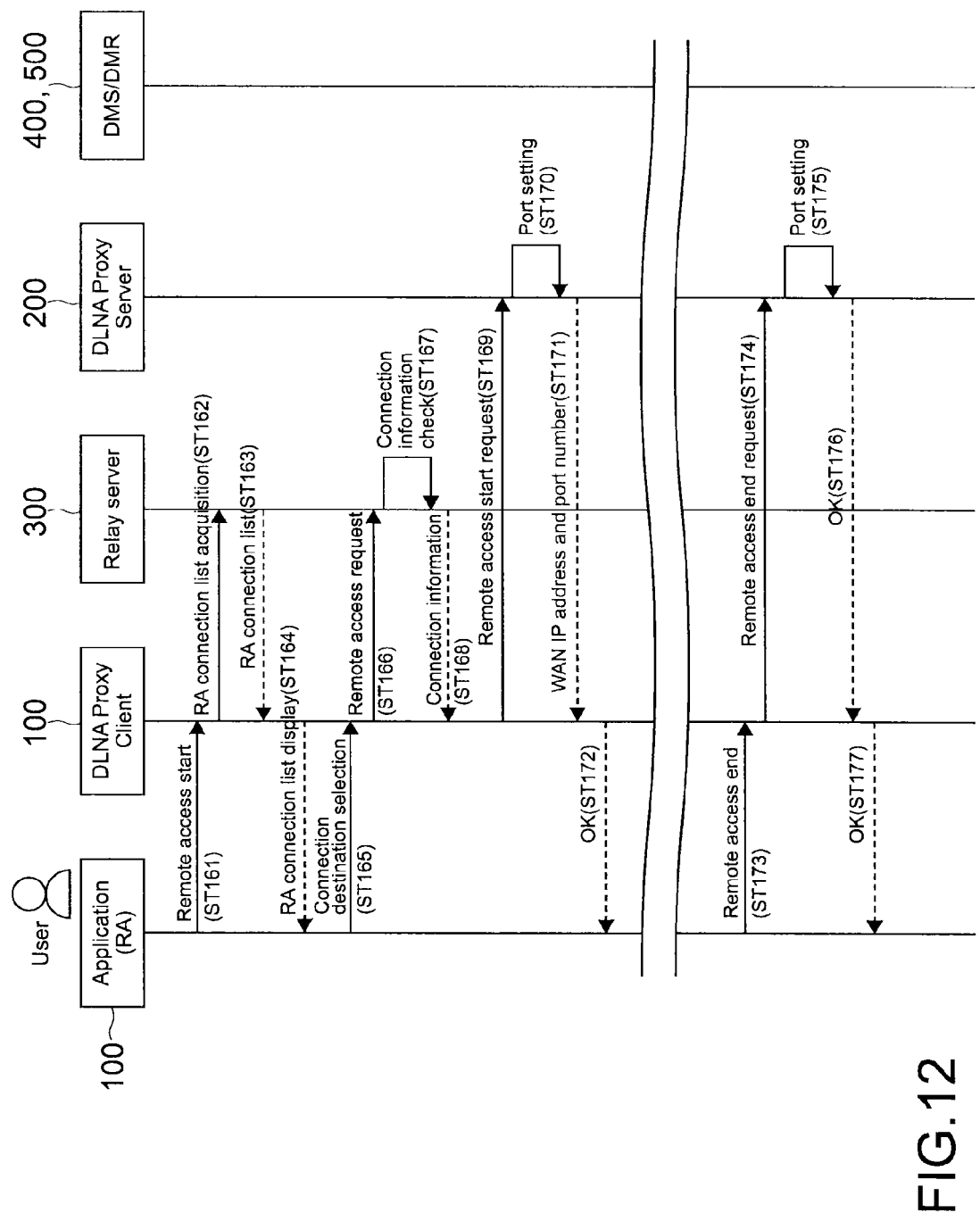
FIG. 12 is a sequence diagram showing a flow of port setting processing according to a third embodiment of the present disclosure.

FIG. 12 is a sequence diagram showing a flow of the port setting processing in this case.

As shown in the figure, the processing of Steps 161 to 166 is the same as that of Steps 71 to 76 of FIG. 6.

The proxy client 100 requests the relay server 300 of a remote access (Step 166) and acquires connection information with respect to the proxy server 200 (Steps 167 and 168).

Using the connection information, the proxy client 100 requests the proxy server 200 to start the remote access and also requests to open port (Step 169).

Upon receiving the request, the proxy server 200 opens the port of the router (Step 170) and transmits the IP address and port number for the WAN to the proxy client 100 (Steps 171 and 172).

Then, as the user instructs to end the remote access through various types of remote control processing such as the remote reproduction processing (Step 173), the proxy client 100 requests the proxy server 200 to end the remote access and also requests to close the port of the router (Step 174).

Upon receiving the request, the proxy server 200 closes the port (Step 175) and notifies the proxy client 100 side of the fact (Steps 178 and 179).

By the processing as described above, the port is constantly opened during the remote access. Therefore, performance by the remote access is fully exerted.

Fourth Embodiment

Next, a fourth embodiment of the present disclosure will be described. In descriptions below, descriptions on structures that are the same as those of the first to third embodiments will be omitted.

In the first to third embodiments above, the example of executing the remote reproduction with the DMR from the DMS on the home network to which the proxy server 200 belongs has been described. However, the DMS may be a content server on a cloud.

Figure 13:
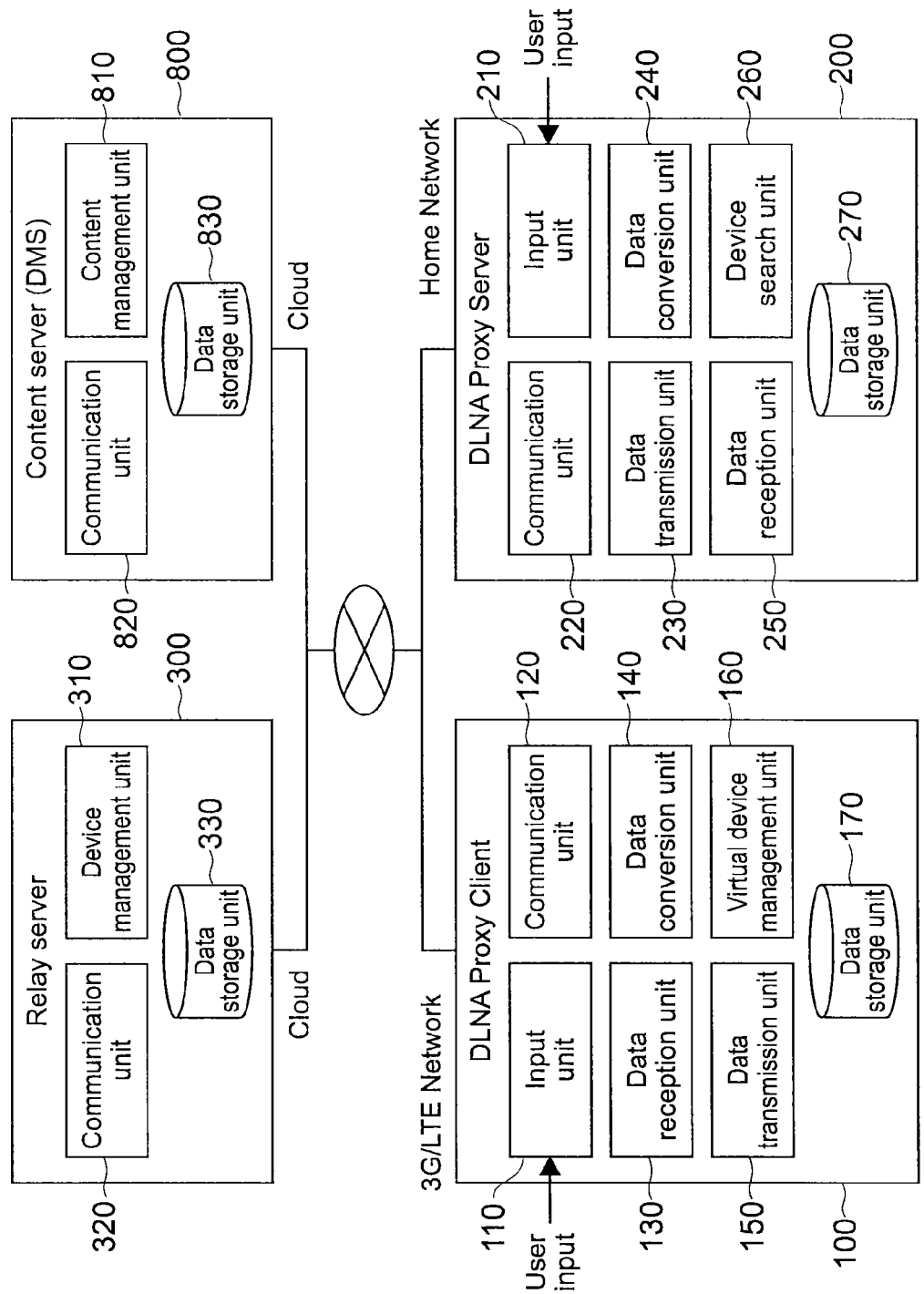
FIG. 13 is a diagram showing a structure of a system according to a fourth embodiment of the present disclosure.

FIG. 13 is a diagram showing a structure of a system of this embodiment. As shown in the figure, the structures of the proxy client 100, the proxy server 200, and the relay server 300 are the same as those shown in FIG. 4, and thus descriptions thereof will be omitted.

In addition to the structures shown in FIG. 4, in this embodiment, a content server 800 as the DMS is provided on a cloud. Although one content server 800 is illustrated in this figure, there may be a plurality of content servers.

The content server 800 includes a content management unit 810, a communication unit 820, and a data storage unit 830.

The content management unit 810 successively stores contents (moving image contents and audio contents) in the data storage unit 830 and manages them.

The communication unit 820 assumes communication processing with the proxy client 100 and the proxy server 200.

Figure 14:
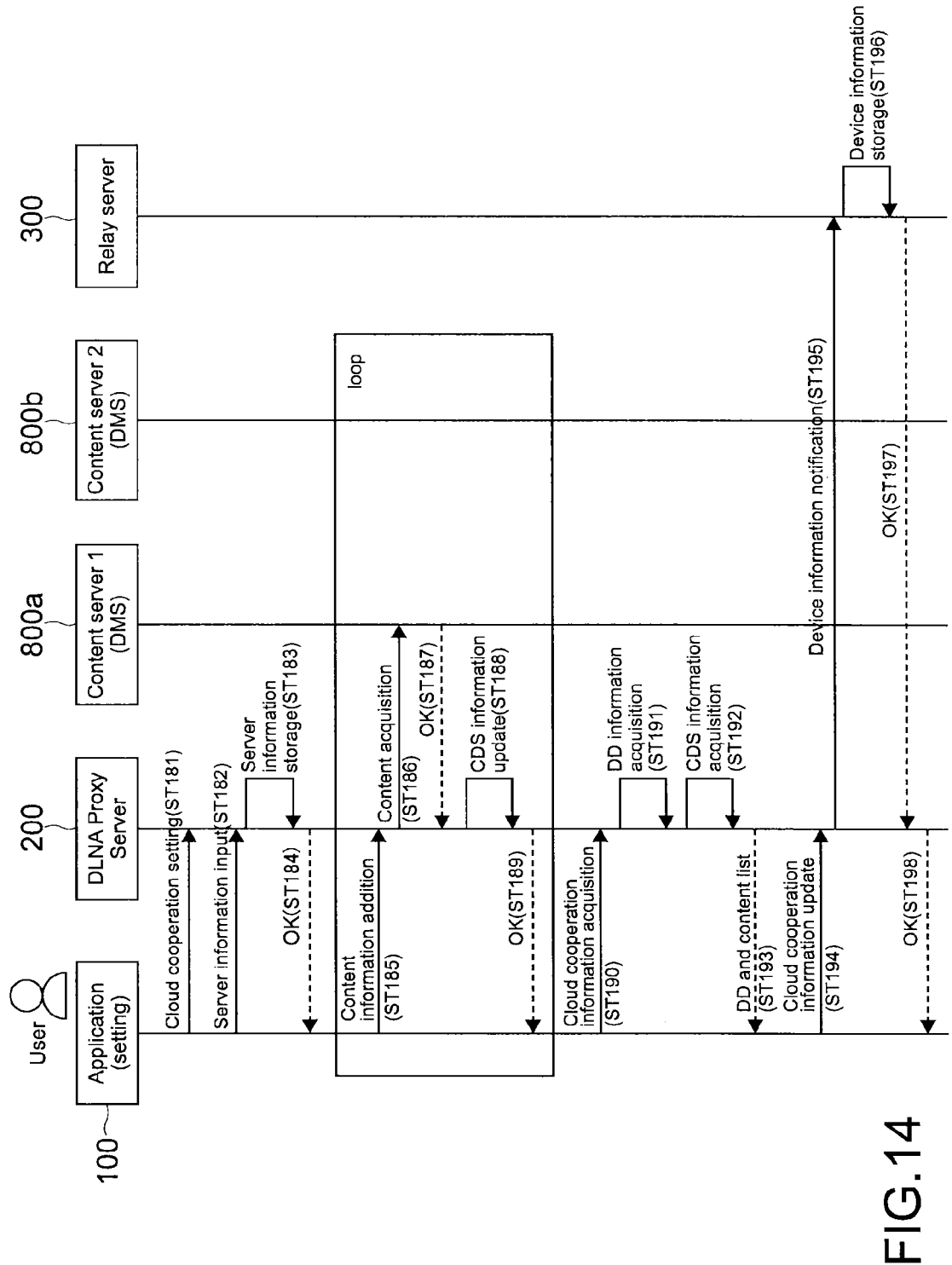
FIG. 14 is a sequence diagram showing a flow of Device Description and content list acquisition processing according to the fourth embodiment of the present disclosure.

FIG. 14 is a sequence diagram showing a flow of the Device Description and content list acquisition processing of this embodiment.

As shown in the figure, the user first instructs the proxy server 200 to perform a cloud cooperation setting from a setting menu of the application (Step 181).

First, server information such as a device name, owner, and location information in a case of causing the content server 800 to function as the DMS is input (Step 182). The proxy server 200 stores the server information (Step 183).

Subsequently, information of a remote reproduction target content is added (Step 185). In this case, the user inputs a URL of a content on the cloud (content server 800). The content to be registered may extend across a plurality of content servers 800 on the cloud.

As the URL is input, the proxy server 200 acquires the content from the URL (Steps 186 and 187), acquires meta information (CDS (Contents Directory Service) information) thereof, and stores it in the data storage unit 270 (Steps 188 and 189).

When the user selects a cloud cooperation information acquisition for checking cloud setting information (Step 190), the proxy server 200 acquires the created Device Description and a content list as a result of CDS:Browse( ) in which a tree root (id=0) is designated (Steps 191 and 192) and transmits them back to the user (Step 193). Here, it is also possible for the user to further execute CDS:Browse( ) using a setting application, burrow through the layers to acquire a content list of a child or grandchild directory, and thus confirm the setting content.

Finally, as the user updates the cloud cooperation information (Step 194), information on the newly-added DLNA device, that is, the content server 800 is notified to the relay server 300 (Step 195).

The relay server 300 stores the device information in the data storage unit 330 (Step 198) and notifies the proxy server 200 side of that fact (Steps 197 and 198).

Accordingly, the device registered by the cloud cooperation (content server 800) behaves as if existing on the home network by the proxy server 200. As long as the proxy server is present, the devices continue to exist.

The processing after that is almost the same as that of the first embodiment, but since the content itself is on the cloud, settings for opening/closing a port of the router are unnecessary in performing the remote reproduction.

Modified Example

The present disclosure is not limited to the embodiments above and can be variously modified without departing from the gist of the present disclosure.

In the embodiments above, the remote reproduction processing of a content stored in the DMS has been described as a specific example of the remote control processing. However, processing that can be performed by the remote access is not limited to the content reproduction processing. For example, transfer (copy) processing of a content (moving image, still image, music, etc.) from a DMS belonging to one LAN to a DMS belonging to another LAN may be executed by the same remote control processing. Moreover, a content synchronization reproduction processing may be executed in a DMR belonging to one LAN and a DMR belonging to another LAN.

In the embodiments above, the smartphone that is located outside and connected to the 3G/LTE network has been used as the DMC. However, other devices such as a PC and a tablet (may either be portable or desktop) may execute the remote control processing from other networks such as a LAN.

The embodiments above have presupposed a home network system according to DLNA. However, the remote control processing of the present disclosure may be executed by a protocol other than DLNA.

In the embodiments above, the present disclosure has been realized by the hardware described with reference to FIGS. 2 and 3 and the software modules shown in FIG. 4. However, the present disclosure may be realized by other hardware such as a dedicated circuit in place of the software modules.

[Others]

The present disclosure may also take the following structures.

(1) An information processing apparatus, including:
a communication unit capable of connecting to, via a fourth network, a first server and a first device existing in a first network, a second server and a second device existing in a second network, and a relay server that exists in a third network and stores connection information with respect to the first server and the second server; and
a controller capable of controlling the communication unit to receive the connection information from the relay server and controlling data transmission processing between the first device and the second device via the first server and the second server using the connection information.

(2) The information processing apparatus according to (1) above, in which:
a plurality of first devices exist in the first network;
a plurality of second devices exist in the second network;
the relay server stores a device list including the connection information with respect to the plurality of first devices and the plurality of second devices; and
the controller is capable of controlling the communication unit to receive the device list from the relay server, generate a message to one of the first device and the second device based on the device list, and transmit the message to one of the first server and the second server.

(3) The information processing apparatus according to (2) above, further including
a display unit,
in which the controller is capable of controlling the display unit to display, as the device list, attribute information of the first device and the second device such that which of the first network and the second network each of the first device and the second device belongs to can be distinguished, and generating the message to one of the first device and the second device selected by a user from the device list.

(4) The information processing apparatus according to (3) above, in which:
the first network is built inside a first facility;
the second network is built inside a second facility; and
the controller is capable of controlling the display unit to incorporate, as the attribute information, positional information indicating a position of the first device in the first facility and a position of the second device in the second facility into the device list.

(5) The information processing apparatus according to any one of (1) to (4) above, in which:
a first router exists in the first network;
a second router exists in the second network; and
the controller is capable of controlling the communication unit to transmit, via the second server, an open request that requests the second router to open a port so that the first device can access the second device.

(6) The information processing apparatus according to (5) above, in which:
the second device stores a content; and
the controller is capable of controlling the communication unit to transmit the open request when starting a transmission of a message between the first device and the second device for streaming the content from the second device to the first device, and transmit, via the second server, a close request that requests the second router to close the port when the streaming ends.

(7) The information processing apparatus according to (5) above,
in which the controller is capable of controlling the communication unit to transmit the open request when starting an access to one of the first server and the second server using the received connection information, and transmit, via the second server, a close request that requests the second router to close the port when ending the access to one of the first server and the second server.

(8) The information processing apparatus according to any one of (1) to (7) above, in which:
the controller is capable of controlling the communication unit to transmit a search request for one of the first device and the second device to one of the first server and the second server;
the controller generates a server socket when receiving a discovery notification with respect to the search request and emulates a virtual device on a local host; and
the controller is capable of controlling the communication unit to respond to, via one of the first server and the second server, the message that has been transmitted from one of the first device and the second device via one of the first server and the second server and received via the server socket using the virtual device.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus provided in a fourth network, comprising:
circuitry configured to:
connect to a first server and a first device provided in a first network, a second server and a second device provided in a second network, and a relay server that is provided in a third network and that stores a device list including an entry for each of the first device and the second device and including connection information with respect to the first server and the second server;
receive the device list including the entry and the connection information from the relay server, the connection information providing information for the information processing apparatus to initiate remote access to the first server and the second server;
initiate said remote access to the first server and the second server based on the connection information; and
instruct, based on the initiated remote access to the first server and the second server, the first device to retrieve content from the second device, and reproduce the retrieved content on the first device,
wherein the first network, the second network, the third network, and the fourth network are distinct from each other.

2. The information processing apparatus according to claim 1, wherein:
a first plurality of devices exist in the first network;
a second plurality of devices exist in the second network;
the relay server stores the device list including the connection information with respect to the first plurality of devices and the second plurality of devices; and
the circuitry is configured to receive the device list from the relay server, generate a message to one of the first device and the second device based on the device list, and transmit the message to one of the first server and the second server.

3. The information processing apparatus according to claim 2, further comprising:
a display,
wherein the circuitry is configured to control the display to display, as the device list, attribute information of the first device and the second device such that which of the first network and the second network each of the first device and the second device belongs to can be distinguished, and generate the message to one of the first device and the second device selected by a user from the device list.

4. The information processing apparatus according to claim 3, wherein:
the first network is built inside a first facility;
the second network is built inside a second facility; and
the circuitry is configured to control the display to incorporate, as the attribute information, positional information indicating a position of the first device in the first facility and a position of the second device in the second facility into the device list.

5. The information processing apparatus according to claim 1, wherein:
a first router exists in the first network;
a second router exists in the second network; and
the circuitry is configured to transmit, via the second server, an open request that requests the second router to open a port so that the first device can access the second device.

6. The information processing apparatus according to claim 5, wherein:
the second device stores the content; and
the circuitry is configured to transmit the open request when starting a transmission of a message between the first device and the second device for streaming the content from the second device to the first device, and transmit, via the second server, a close request that requests the second router to close the port when the streaming ends.

7. The information processing apparatus according to claim 5,
wherein the circuitry is configured to transmit the open request when starting an access to one of the first server and the second server using the received connection information, and transmit, via the second server, a close request that requests the second router to close the port when ending the access to one of the first server and the second server.

8. The information processing apparatus according to claim 1, wherein:
the circuitry is configured to transmit a search request for one of the first device and the second device to one of the first server and the second server;
the circuitry is configured to generate a server socket when receiving a discovery notification with respect to the search request and emulate a virtual device on a local host; and
the circuitry is configured to respond to, via one of the first server and the second server, a message that has been transmitted from one of the first device and the second device via one of the first server and the second server and received via the server socket using the virtual device.

9. The information processing apparatus according to claim 1, wherein the circuitry is configured to transmit a request to the relay server requesting the connection information, and to receive the connection information from the relay server in response to the transmitted request.

10. The information processing apparatus according to claim 3, wherein the circuitry is configured to control the display to incorporate, as the attribute information, ownership information indicating an owner of the first device and an owner of the second device into the device list.

11. The information processing apparatus according to claim 1, wherein when the first device disappears from the first network, the circuitry is configured to receive a notification that the first device has disappeared from the first network after a predetermined elapse of time since the first device was determined to have disappeared.

12. The information processing apparatus according to claim 1, wherein the first server enables external communication with the first device, and the second server enables external communication with the second device.

13. The information processing apparatus according to claim 1, wherein the circuitry is configured to receive a discovery notification from the first server or the second server when the first server or the second server discovers a new device in the first network or the second network.

14. The information processing apparatus according to claim 13, wherein the discovery notification enables the information processing apparatus to connect to the new device in the first network or the second network.

15. An information processing method, comprising:
receiving, using an information processing apparatus provided in a fourth network, a device list including an entry for each of a first device provided in a first network and a second device provided in a second network and including connection information with respect to a first server provided in the first network and a second server provided in the second network from a relay server that stores the device list including the entry and the connection information and that is provided in a third network, the connection information providing information for the information processing apparatus to initiate remote access to the first server and the second server;
initiating, using the information processing apparatus, said remote access to the first server and the second server based on the connection information; and
instructing, using the information processing apparatus based on the initiated remote access to the first server and the second server, the first device provided in the first network to
retrieve content from the second device provided in the second network, and
reproduce the retrieved content on the first device,
wherein the first network, the second network, the third network, and the fourth network are distinct from each other.

16. A non-transitory computer-readable storage medium including computer-readable instructions that, when executed by a computer, cause a computer to execute a method comprising:
receiving, using an information processing apparatus provided in a fourth network, a device list including an entry for each of a first device provided in a first network and a second device provided in a second network and including connection information with respect to a first server provided in the first network and a second server provided in the second network from a relay server that stores the device list including the entry and the connection information and that is provided in a third network, the connection information providing information for the information processing apparatus to initiate remote access to the first server and the second server,
initiating, using the information processing apparatus, said remote access to the first server and the second server based on the connection information; and
instructing, using the information processing apparatus based on the initiated remote access to the first server and the second server, the first device provided in the first network to
retrieve content from the second device provided in the second network, and
reproduce the retrieved content on the first device,
wherein the first network, the second network, the third network, and the fourth network are distinct from each other.

* * * * *